United States Patent

Schwarz et al.

[15] 3,645,519
[45] Feb. 29, 1972

[54] ROPE OR CHAIN RUPTURE SAFETY DEVICE

[72] Inventors: Walter Schwarz, Linz; Karl Steinmair, Schiedlberg, both of Austria

[73] Assignee: Vereinigte Osterreichische Eisen-und Stahlwerke Aktiengesellschaft, Linz, Austria

[22] Filed: July 13, 1970

[21] Appl. No.: 54,469

[30] Foreign Application Priority Data

July 31, 1969 Austria ..............................A 7379/69

[52] U.S. Cl. ............................266/34 LM, 187/71, 254/144
[51] Int. Cl. ..............................................................C21c 7/06
[58] Field of Search ...................266/34 L, 34 LM; 254/144; 187/71

[56] References Cited

UNITED STATES PATENTS 3,366,376  1/1968  Marino ............................266/34 LM
3,393,906  7/1968  Schweng ..........................266/34 LM
3,501,136  3/1970  Schweng et al. ..................266/34 LM

*Primary Examiner*—Gerald A. Dost
*Attorney*—Kurt Kelman

[57] ABSTRACT

A rope or chain rupture safety device for a blowing lance secured to two ropes or chains, respectively, of which one rope or chain is passed over a driven main drum and the other rope or chain is passed over an unstressed auxiliary drum, the auxiliary drum being connected with said main drum by means of a multiplate friction clutch arranged between them and rotatable relative to said main drum in case of a rope or chain rupture, in which the improvement resides in that the auxiliary drum comprises an element which is rotatable relative to the main drum, connected with the shaft of the main drum by screw threaded means and screwable towards the friction clutch under progressively increasing engagement pressure of the plates of the friction clutch. This design is simple and safe. It affords the advantage that the auxiliary rope is loaded only with the double nominal load when the main rope breaks and that the initial braking moment may be lower by about one-third than so far.

5 Claims, 3 Drawing Figures

Patented Feb. 29, 1972

INVENTORS
WALTER SCHWARZ
KARL STEINMAIR
BY
Kurt Kelman
AGENT

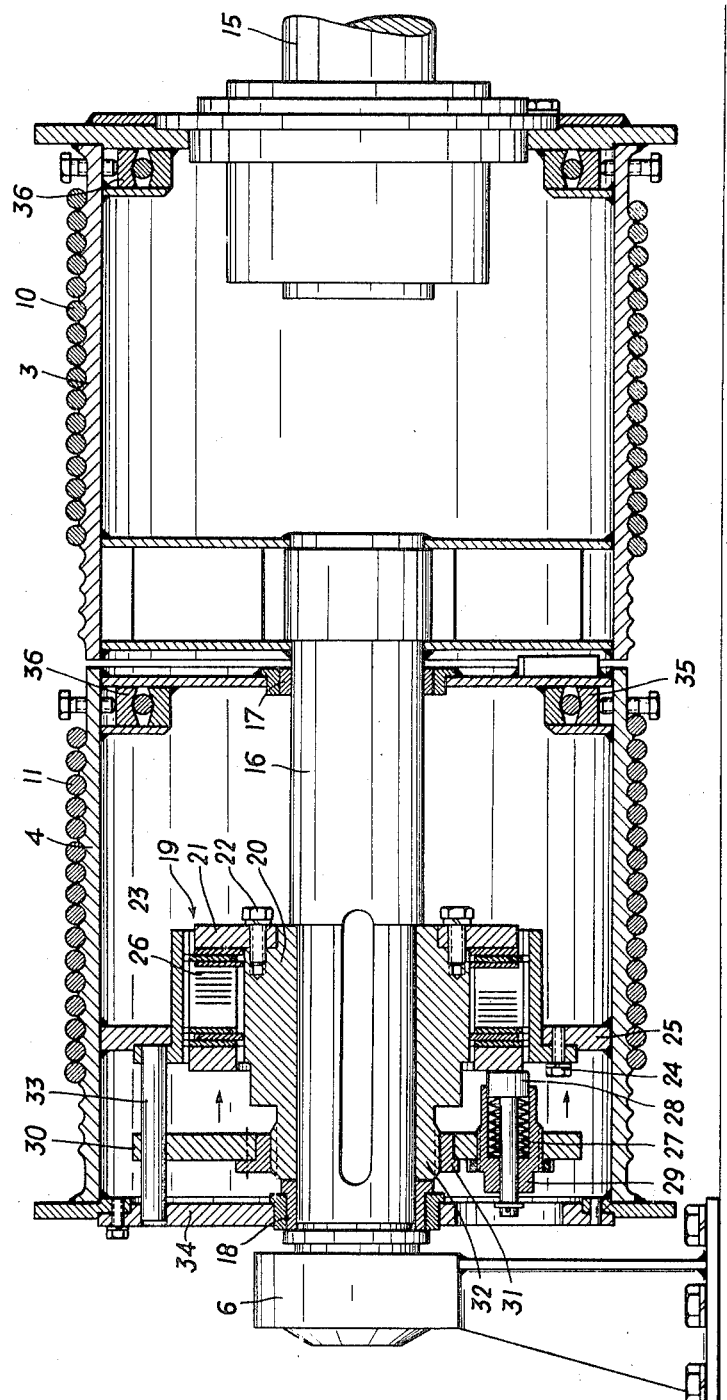

ROPE OR CHAIN RUPTURE SAFETY DEVICE

The invention relates to a rope rupture safety device for a blowing lance secured to two ropes of which one rope is passed over a driven main drum and the other rope is passed over an unstressed auxiliary drum, the auxiliary drum being connected with said main drum by means of a multiplate friction clutch arranged between them and rotatable relative to said main drum in case of a rope rupture. The word "rope" as used herein is understood to comprise any kind of cordage, cables or chains as are conventional in hoisting technique.

A rope rupture safety device of this kind developed by applicants is described in the U.S.A. Pat. No. 3,393,906 and in the British Letters Pat. No. 1,064,309. In this device, in the event of a rope rupture, the fall of the lance is softly braked when a torque which is determined by the prestress applied in the multiplate-clutch is exceeded, before a rigid connection is effected between the main rope drum and the auxiliary drum by a ratchet catch.

The present invention is aimed at further developing and improving the known device, and, more particularly, at increasing the engagement pressure of the plates and thus progressively increasing the braking moment in dependence on the relative movement between the auxiliary drum and the main drum in a manner that at the end of the rotation path the cushioning frictional engagement changes into a form locking connection.

A further aim of the invention resides in making it possible to adjust the initial prestress of the springs, which prestress corresponds to the initial braking moment, to be lower than so far, which affords the advantage that, while the safety effect remains the same as before, the auxiliary rope or chain, respectively, may be dimensioned lighter than up to now.

These aims of the invention are achieved in a rope or chain rupture safety device of the kind described in the introduction in that one element of the auxiliary drum which is rotatable in relation to the main drum is connected with the shaft of the main drum by means of a screw thread and may be screwed towards the friction clutch under progressively increasing engagement pressure of the plates of the friction clutch.

Advantageously, prestressed springs are provided between the element of the auxiliary drum which rotates with the auxiliary drum and is suitably designed as a disc, and the plates of the friction clutch, which springs are compressed when the disc is screwed towards the friction clutch.

According to a suitable embodiment of the invention the auxiliary drum is mounted to be rotatable on a shaft which is rigidly connected with the main drum, the friction clutch, the rotatable element with a threaded sleeve and a pin fixed to the shaft and provided with a corresponding screw thread being arranged within the auxiliary drum.

For reasons of safety a stop may be provided for limiting the rotation path of the auxiliary drum in relation to the main drum; for example a maximum rotation path of 360° may be provided, before the auxiliary drum gets into form-locking connection with the main drum by means of the stop.

In order that the invention may be more fully understood an embodiment thereof shall now be explained with reference to the accompanying drawings, in which FIG. 1 schematically shows a winch for a blowing lance with a rope or chain rupture safety device according to the invention.

FIG. 2 is a vertical sectional view of the main and the auxiliary drums.

Figure 1:
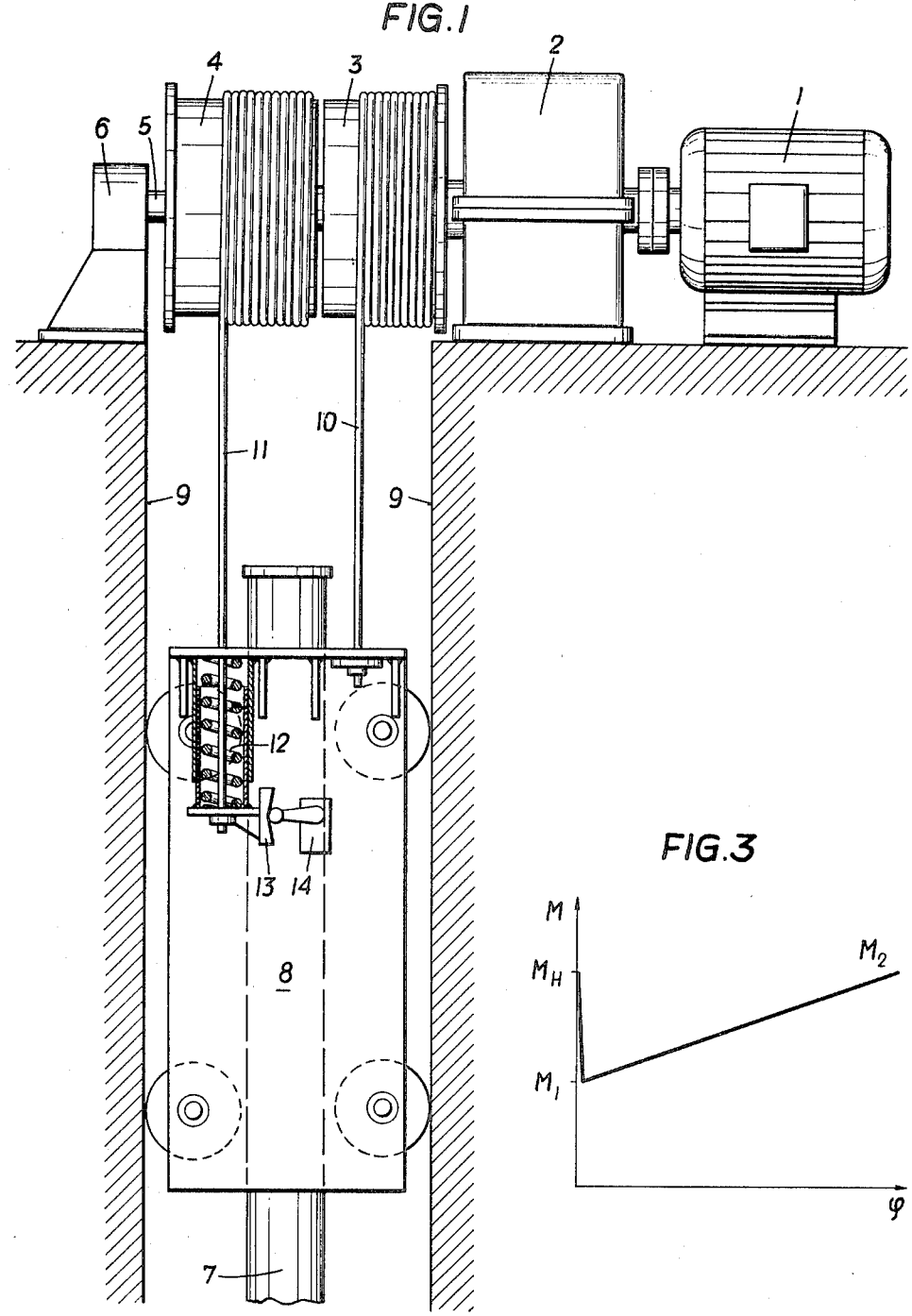

In FIG. 1 numeral 1 denotes a motor which drives the main drum 3 and the auxiliary drum 4 via the gear 2. The main and the auxiliary drums are mounted in the bearing block 6 by means of a common shaft 5. The blowing lance 7 is fixed to a vehicle 8 movable in the guides 9 in vertical direction by means of the winch. The load of the vehicle and of the lance is borne by the main rope 10 whereas the auxiliary rope 11 is fixed to the spring biased suspension 12 and is idling with little prestress. A trip cam 13 is provided at the spring-biased suspension 12, which trip cam actuates a limit switch 14 towards both sides in the case of spring deflections which in turn causes the lifting motor 1 to be switched off and braked.

In case of disturbances, i.e., when the rope 10 is slack or overstressed, elongated excessively or ruptures the spring of the suspension 12 expands or is compressed, and thus actuates the final switch 14 which, in turn, causes the lifting and lowering movement to be stopped immediately. When the main rope 10 has been torn the load is falling downward until the spring biased suspension 12 is completely pressed together and the entire load is received by the auxiliary rope 11. Now the load is suspended on the auxiliary drum 4 and is to be braked.

FIG. 2 serves to explain in detail how the multiplate friction clutch acting as a brake functions. The main drum 3 is flanged to the shaft end 15 of the gear 2. It is provided with a projecting shaft 16 which is mounted on its far end in the bearing block 6 as has been described above. The auxiliary drum 4 is mounted to be rotatory in bearings 17 and 18 on the shaft 16. By means of the friction clutch 19 it is torque-transmittingly connected with the shaft 16 and rotated with it. The friction clutch comprises a hub 20 which is wedged onto the shaft 16, the stop-disc 21, which is fixed to the hub by means of screws 22, and the clutch housing 23, which is screwed to the flange 25 of the auxiliary drum by means of screws 24. The friction plates 26 are arranged in the recess formed between the hub 20, the stop-disc 21 and the clutch housing 23. The friction plates are acted upon by spring-biased rams or pistons 28. The springs 27 and the rams are arranged in bushings 29 and these bushings are disposed in bores of the panel 30. This panel 30 is connected with an internally threaded sleeve 31 which is rotatable or screwable axially in the direction of the arrows towards the friction plates 26 on a externally threaded pin 32 of the wedged-up hub. The panel 30 is connected by means of a tappet 33 with the front wall 34 of the auxiliary drum 4 and axially displaceable relative to it.

In the following it will be described how the device works: When the main rope 10 breaks, the auxiliary rope 11 is tightened, as has been described earlier, and the auxiliary drum 4 is rotated against the resistance of the springs 27 and the friction between the friction plates 26 relative to the main drum 3, so that the pressure force of the friction plates is progressively increased in dependence on the rotation angle. The more the panel 30 is screwed on the threaded pin 32, i.e., the more the panel 30 is displaced axially towards the friction clutch 19, the more the tension of the springs 27 and thus the engagement pressure of the friction plates 26 is increased or the friction moment is enlarged.

Figure 3:
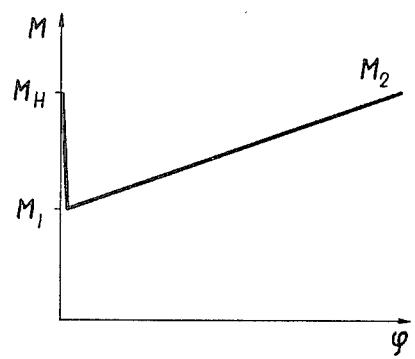
FIG. 3 illustrates the behavior of the plate friction moment with increasing rotation angle of the auxiliary drum.

In FIG. 3 the behavior of the friction moment M of the plates in dependence on the rotation angle $\phi$ of the auxiliary drum is illustrated. At the beginning of the rotation the moment has a peak value (adherence moment $M_H$) owing to the high adherence friction. When sliding is started the moment decreases, as a result of the lower sliding friction, to the value $M_1$ which is about half of $M_H$; upon further rotation of the auxiliary drum $M_1$ grows again to $M_2$ owing to the increase of the engagement pressure of the plates.

For reasons of safety it may be suitable to provide in addition for a stop between the auxiliary drum and the main drum in order to limit the possible rotation path. Such a stop is denoted with numeral 35 in FIG. 2. The ropes may be fastened to the drums by means of clamping jaws 36.

The device according to the invention is superior to the known rope or chain rupture safety devices because it offers a number of advantages. The friction plates, which provide for the connection between the main drum and the auxiliary drum need no longer be pressed together with constant engagement pressure; thus, the initial braking moment ($M_1$ in FIG. 3) may be adjusted to be lower by about 1/3 than so far which again is responsible for the fact that the adherence moment $M_H$ becomes smaller in the same degree. In the device according to the invention the auxiliary rope is loaded when the initial impact occurs only with the double nominal load, whereas in the known devices the auxiliary rope had to bear account for a threefold nominal load. With an equal dimension of the auxiliary rope a higher operational safety is thus gained. Since the actual braking moment depends on numerous factors some of which cannot be evaluated at all, such as fatigue of the material, ageing, varying temperature influences, changes in the friction value by environmental factors such as dust, dirt, humidity, it should be pointed out that in the present invention these unsafety factors are completely eliminated because the springs are automatically tightened when the auxiliary drum rotates and the braking moment is increased until the lance is brought to a standstill in any case. Furthermore the device according to the invention involves constructive simplifications over known devices because such complicated parts as ratchet wheels and so on may be left away.

We claim:

1. A rope rupture safety device for a blowing lance secured to two ropes, whereof one rope is passed over a driven main drum and the other rope is passed over an idling auxiliary drum connected with said main drum through an interposed multiplate friction clutch and rotatable relative to said main drum in the event of a rope rupture, said auxiliary drum comprising an element which is rotatable relative to said main drum, connected to a projecting shaft portion of said main drum by means of a screw thread and screwable towards the friction clutch under progressively increasing engagement pressure of the plates of the friction clutch.

2. The safety device set forth in claim 1, wherein prestressed springs are provided between said element rotatable together with said auxiliary drum and the plates of the friction clutch, which springs are pressed together when said element is screwed towards the friction clutch.

3. The safety device set forth in claim 1, wherein said element of said auxiliary drum is designed as a disc.

4. The safety device set forth in claim 1, wherein said shaft portion on which the auxiliary drum is rotatable is rigidly fixed to said main drum, the friction clutch, said rotatable element with a threaded sleeve, and a pin fixed to said shaft and provided with a corresponding screw thread being arranged within the auxiliary drum.

5. The safety device set forth in claim 1, wherein a stop is provided for limiting the rotation path of the auxiliary drum in relation to the main drum.

* * * * *